(12) United States Patent
Elkins

(10) Patent No.: US 12,026,941 B2
(45) Date of Patent: Jul. 2, 2024

(54) SYSTEM AND METHOD FOR DETERMINING WORK VEHICLE OPERATIONAL STATE USING A UAV

(71) Applicant: CNH Industrial America LLC, New Holland, PA (US)

(72) Inventor: Scott A. Elkins, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 286 days.

(21) Appl. No.: 17/461,012

(22) Filed: Aug. 30, 2021

(65) Prior Publication Data
US 2023/0064115 A1   Mar. 2, 2023

(51) Int. Cl.
| | | |
|---|---|---|
| *G06V 20/17* | (2022.01) | |
| *B64C 39/02* | (2023.01) | |
| *G05D 1/00* | (2006.01) | |
| *G08G 5/00* | (2006.01) | |
| *B64U 101/30* | (2023.01) | |

(52) U.S. Cl.
CPC ............ *G06V 20/17* (2022.01); *B64C 39/024* (2013.01); *G05D 1/0022* (2013.01); *G08G 5/003* (2013.01); *B64U 2101/30* (2023.01)

(58) Field of Classification Search
CPC .. G06Q 10/0635; G06Q 10/02; G06Q 50/265; G06Q 50/30; G06F 18/22; G06V 40/172; G06V 40/50; G07C 9/28; G07C 9/37
USPC ....................................................... 382/103
See application file for complete search history.

(56) References Cited

U.S. PATENT DOCUMENTS

| | | |
|---|---|---|
| 9,371,133 B2 | 6/2016 | Mays |
| 10,317,905 B2 | 6/2019 | Ouellette et al. |
| 2018/0101956 A1 | 4/2018 | Elkins |
| 2019/0055015 A1 | 2/2019 | Allard et al. |
| 2019/0064836 A1 | 2/2019 | Buttolo et al. |
| 2019/0205486 A1 | 7/2019 | Santarone et al. |
| 2019/0266715 A1 | 8/2019 | Myers et al. |
| 2020/0257318 A1* | 8/2020 | Nahuel-Andrejuk ... B64C 25/32 |
| 2022/0165058 A1* | 5/2022 | Toda ....................... G06V 20/17 |
| 2022/0348322 A1* | 11/2022 | Zemenchik ............ A01B 76/00 |

FOREIGN PATENT DOCUMENTS

| | | | |
|---|---|---|---|
| CA | 3025554 A1 | 5/2019 | |
| CN | 113364516 | * 9/2021 | ......... H04B 7/18506 |
| WO | WO 2019/158171 A1 | 8/2019 | |

\* cited by examiner

*Primary Examiner* — Jerome Grant, II
(74) *Attorney, Agent, or Firm* — Rickard K. DeMille; Rebecca L. Henkel; Peter K. Zacharias

(57) ABSTRACT

A system for determining work vehicle operational state includes an unmanned aerial vehicle (UAV) configured to fly relative to a work vehicle and an imaging device supported on the UAV. In this respect, the imaging device is configured to capture a plurality of images of the work vehicle as the UAV flies relative to the work vehicle, with each captured image depicting one of a plurality of inspection points on the work vehicle. Furthermore, the system includes a computing system configured is receive the plurality of captured images from the imaging device and access a plurality of stored images, with each stored image depicting one of the plurality of inspection points in an operational state. Additionally, the computing system is configured to compare each captured image to one of the stored images to determine when the corresponding inspection point is in the operational state.

18 Claims, 7 Drawing Sheets

SYSTEM AND METHOD FOR DETERMINING WORK VEHICLE OPERATIONAL STATE USING A UAV

FIELD OF THE INVENTION

The present disclosure generally relates to work vehicles, such as construction vehicles, and, more particularly, to systems and methods for determining the operational state or status of a work vehicle using an unmanned aerial vehicle (UAV).

BACKGROUND OF THE INVENTION

Construction vehicles and other work vehicles include various components that need periodic replacement or adjustment due to wear or damage incurred during operation. For example, such components may include the blade (e.g., on a dozer, grader, etc.), the hydraulic components (e.g., the hoses, cylinders, seals, etc.), the track assemblies, and/or the like. In this respect, to ensure proper operation of the construction vehicle, it is generally necessary to for the operator to visually inspect certain inspection points of the vehicle for wear/damage before operation. However, operators may fail to perform these pre-operation checks. Moreover, even when the pre-operation checks are performed, some operators may not be able to determine whether a particular inspection point is in an operational state or a non-operational state.

Accordingly, an improved system and method for determining work vehicle operational state would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for determining work vehicle operational state. The system includes an unmanned aerial vehicle (UAV) configured to fly relative to a work vehicle and an imaging device supported on the UAV. In this respect, the imaging device is configured to capture a plurality of images of the work vehicle as the UAV flies relative to the work vehicle, with each captured image depicting one of a plurality of inspection points on the work vehicle. Furthermore, the system includes a computing system communicatively coupled to the imaging device. As such, the computing system configured is receive the plurality of captured images from the imaging device and access a plurality of stored images, with each stored image depicting one of the plurality of inspection points in an operational state. Additionally, the computing system is configured to compare each captured image to one of the stored images to determine when the corresponding inspection point is in the operational state.

In another aspect, the present subject matter is directed to a method for determining an operational state of a work vehicle using an unmanned aerial vehicle (UAV) configured to fly relative to the work vehicle. The UAV, in turn, include an imaging device supported thereon, with the imaging device configured to capture a plurality of images of the work vehicle as the UAV flies relative to the work vehicle such that each captured image depicts one of a plurality of inspection points on the work vehicle. In this respect, the method includes receiving, with a computing system, the plurality of captured images from the imaging device. Moreover, the method includes accessing, with the computing system, a plurality of stored images, with each stored image depicting one of the plurality of inspection points in an operational state. In addition, the method includes comparing, with the computing system, each captured image to one of the stored images to determine when the corresponding inspection point is in the operational state.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
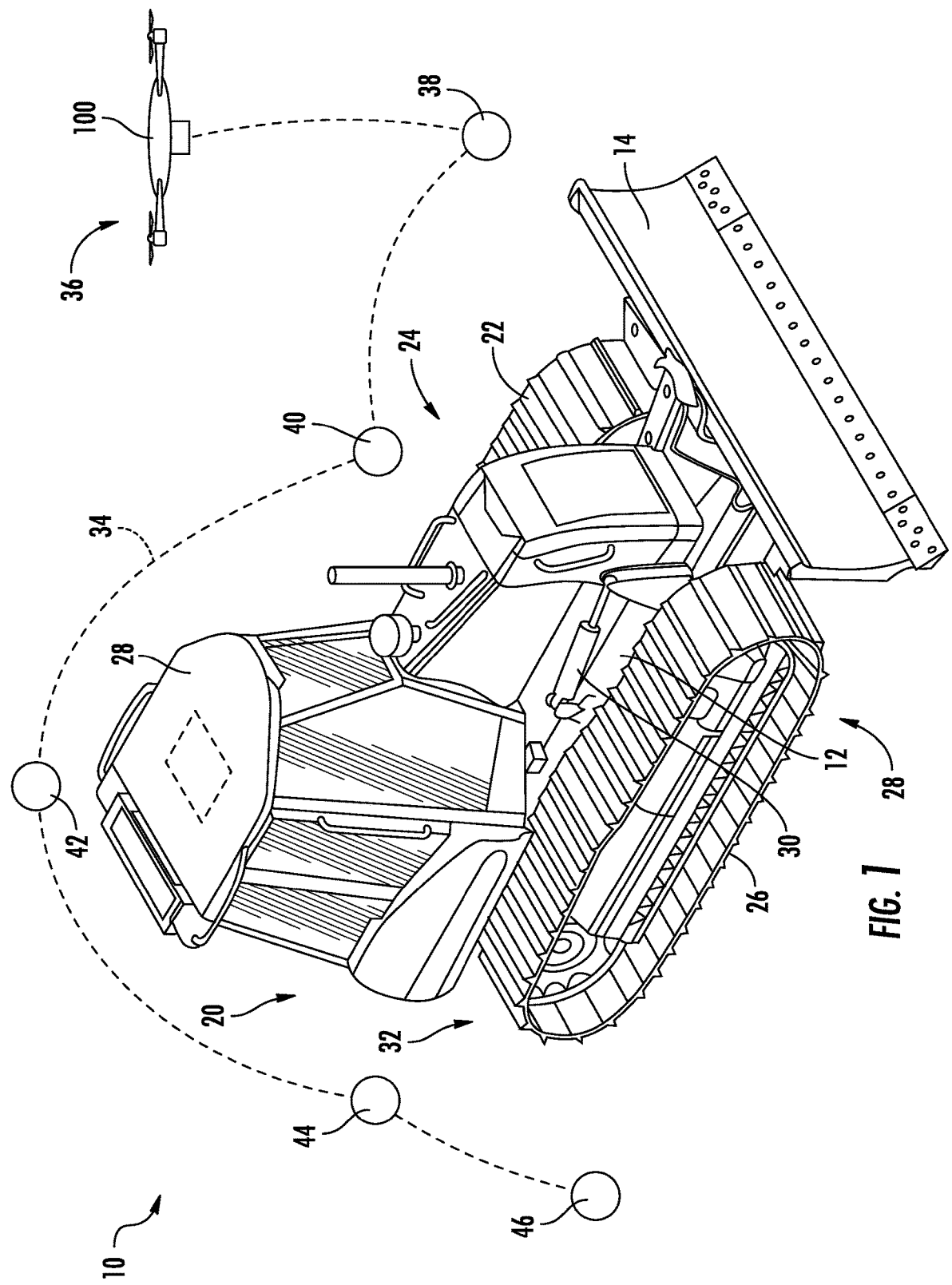
FIG. 1 illustrates a perspective view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining work vehicle operational state. Specifically, the disclosed system includes an unmanned aerial vehicle (UAV) configured to fly relative to a work vehicle (e.g., a construction present at a construction site). Furthermore, the system includes an imaging device (e.g., a camera) supported on the UAV. In this respect, as the UAV flies relative to the work vehicle, the imaging device is configured to capture a plurality of images of the work vehicle. Each captured image, in turn, depicts one of a plurality of inspection points on the work vehicle. For example, the inspection points on the work vehicle may include its blade, its hydraulic component(s), the surface underneath the work vehicle, its track assembly(ies), and/or the like. As such, in one embodiment, the UAV may fly relative to the work vehicle along an inspection flight plan such that the UAV moves to a first position relative to the work vehicle at which the imaging device captures an image of a first inspection point, then to a second position relative to the work vehicle at which the imaging device captures an image of a second inspection point, and so on.

In several embodiments, a computing system of the disclosed system is configured to determine the operational status of the work vehicle based on the images captured by the UAV-mounted imaging device. More specifically, the computing system accesses a plurality of stored images, with each stored image depicting one of the plurality of inspection points in its operational state (e.g., as it would have looked when leaving the factory). Thereafter, for each inspection point, the computing system compares the corresponding captured image to the corresponding stored image to determine when that inspection point is in its operational state. In some embodiments, when all inspection points on the work vehicle are in their operational states and the operator of the vehicle is within a predetermined distance of the vehicle, the computing system may initiate a control action(s), such as activating the heater of the vehicle or starting the engine of the vehicle.

Comparing images of inspection points captured using a UAV-mounted imaging device to the stored images depicting the inspection points in their operational states improves the operation of the work vehicle or an associated fleet of work vehicles. As mentioned above, the operator of a work vehicle may forget or otherwise not perform the pre-operation checks necessary to ensure proper operation of the vehicle. Moreover, even when the pre-operation checks are performed, some operators may be unable to readily determine whether a particular inspection point is in an operational state or a non-operational state. However, by comparing UAV-captured aerial images of the inspection points to stored images depicting the inspection points in their operational states, the disclosed system and method can determine whether a work vehicle is in an operational state and, if not, what inspection points need to be addressed without the need for a visual inspection by the operator. Additionally, when it is determined that the vehicle is in an operational state, the disclosed system and method can initiate control action(s) as mentioned above, thereby reducing the amount of time the operator is present within the vehicle and not performing a work operation (e.g., a construction operation).

Referring now to the drawings, FIG. 1 illustrates a perspective view of one embodiment of a work vehicle 10. In several embodiments, the work vehicle 10 is configured as a construction vehicle, such as the illustrated crawler dozer. However, in other embodiments, the work vehicle 10 may be configured as any other suitable work vehicle known in the art, including those for agricultural and construction applications, transport, sport, and/or the like.

As shown in FIG. 1, the work vehicle 10 may include a chassis 12 configured to support or couple to a plurality of components. For example, in one embodiment, the chassis 12 may be configured to support a blade or grading implement 14 at a forward end 16 of the work vehicle 10 and an enclosed operator's cab 18 at an aft end 20 of the work vehicle 10. Additionally, a first track assembly 22 may be coupled to the chassis 12 on a first side 24 of the work vehicle 10, and a second track assembly 26 may be coupled to the chassis 12 on a second side 28 of the work vehicle 10. However, in alternative embodiments, the chassis 12 may be configured to support or couple to any suitable work vehicle component or configuration of vehicle components.

In several embodiments, the work vehicle 10 may include one or more hydraulic components. For example, in the illustrated embodiments, the work vehicle 10 includes a pair of hydraulic cylinders 30 (one is shown) configured to adjust the position of the blade 14 relative to the chassis 12. In this respect, the work vehicle 10 may include various fluid components (not shown), such as hydraulic lines, reservoirs, pumps, and/or the like, to support the operation of the hydraulic cylinders 30. In alternative embodiments, the work vehicle 10 may include other hydraulic cylinders or components (e.g., motors) in addition to or in lieu of the hydraulic cylinders 30.

Furthermore, the work vehicle 10 may include a location sensor 202. In general, the location sensor 202 may be configured to determine the current location of the work vehicle 10 using a satellite navigation positioning system (e.g., a GPS system, a Galileo positioning system, the Global Navigation satellite system (GLONASS), the BeiDou Satellite Navigation and Positioning system, and/or the like). In such an embodiment, the location determined by the location sensor 202 may be transmitted to a computing system and stored within the computing system's memory for subsequent use in identifying the location of the work vehicle 10. For example, the determined location of the work vehicle 10 may be used to facilitate aerial inspections of the vehicle 10 with an unmanned aerial vehicle (UAV) 100.

Additionally, the work vehicle 10 includes one or more inspection points. In general, each inspection point corresponds to one or more components of the work vehicle 10 or areas on or adjacent to the work vehicle 10 that are inspected before operation of the vehicle 10 with the UAV 100. As will be described below, one or more images of each inspection point are captured using an imaging device mounted on the UAV 100. Thereafter, the captured image(s) of each inspection point are compared to a stored image depicting the corresponding inspection point in its operational state. Based on this comparison, the operational state of each inspection point can be determined.

The work vehicle 10 may include any suitable inspection points. For example, in one embodiment, the inspection points include the vehicle 10 as a whole; the blade 14; the track assemblies 22, 26; one or more hydraulic components of the vehicle 10 (e.g., the hydraulic cylinders 30), and/or a portion of the ground 32 underneath the vehicle 10. However, in alternative embodiments, the vehicle 10 may include any other suitable inspection points in addition to or in lieu of any of the aforementioned inspection points.

As shown in FIG. 1, the UAV 100 may be configured to fly along an inspection flight path (e.g., as indicated by dashed line 34) to capture an image(s) of each inspection point. In general, the inspection flight path 34 corresponds to a flight path along which the UAV 100 flies such that the UAV 100 moves between one or more positions relative to the work vehicle 10 to allow its imaging device to capture an image(s) of each inspection point. For example, in the illustrated embodiment, the inspection flight path 34 extends from a position 36 at which the UAV 100 is locked onto the work vehicle 10 to a second position 38 to a third position 40 to a fourth position 42 and to a fifth position 44. As will be described below, the position 36 where the UAV 100 locks onto the work vehicle 10 may correspond to position that is within a predetermined distance of the vehicle 10 at which the UAV 100 begins the inspection flight path 34. When at the first position 38, the UAV 100 is positioned such that its imaging device can capture an image(s) of the blade 14. Moreover, when at the second position 40, the UAV 100 is positioned such that its imaging device can capture an image(s) of the hydraulic cylinder 30 and/or the track assembly 22 on the first side 24 of the work vehicle 10. In addition, when at the third position 42, the UAV 100 is positioned such that its imaging device can capture an image(s) of the work vehicle 10 as a whole. Furthermore, when at the fourth position 44, the UAV 100 is positioned such that its imaging device can capture an image(s) of the portion of the ground 32 underneath the work vehicle 10. Additionally, when at the fifth position 46, the UAV 100 is positioned such that its imaging device can capture an image(s) of the hydraulic cylinder 30 and/or the track assembly 26 on the second side 24 of the work vehicle 10. However, in alternative embodiments, the inspection flight path 34 may locate the UAV 100 at any other positions relative to the vehicle 10 to allow images of the inspection points to be captured.

It should be appreciated that the configuration of the work vehicle 10 described above and shown in FIG. 1 is provided only to place the present subject matter in an exemplary field of use. Thus, it should be apparent that the present subject matter may be readily adaptable to any manner of work vehicle configuration.

Figure 2:
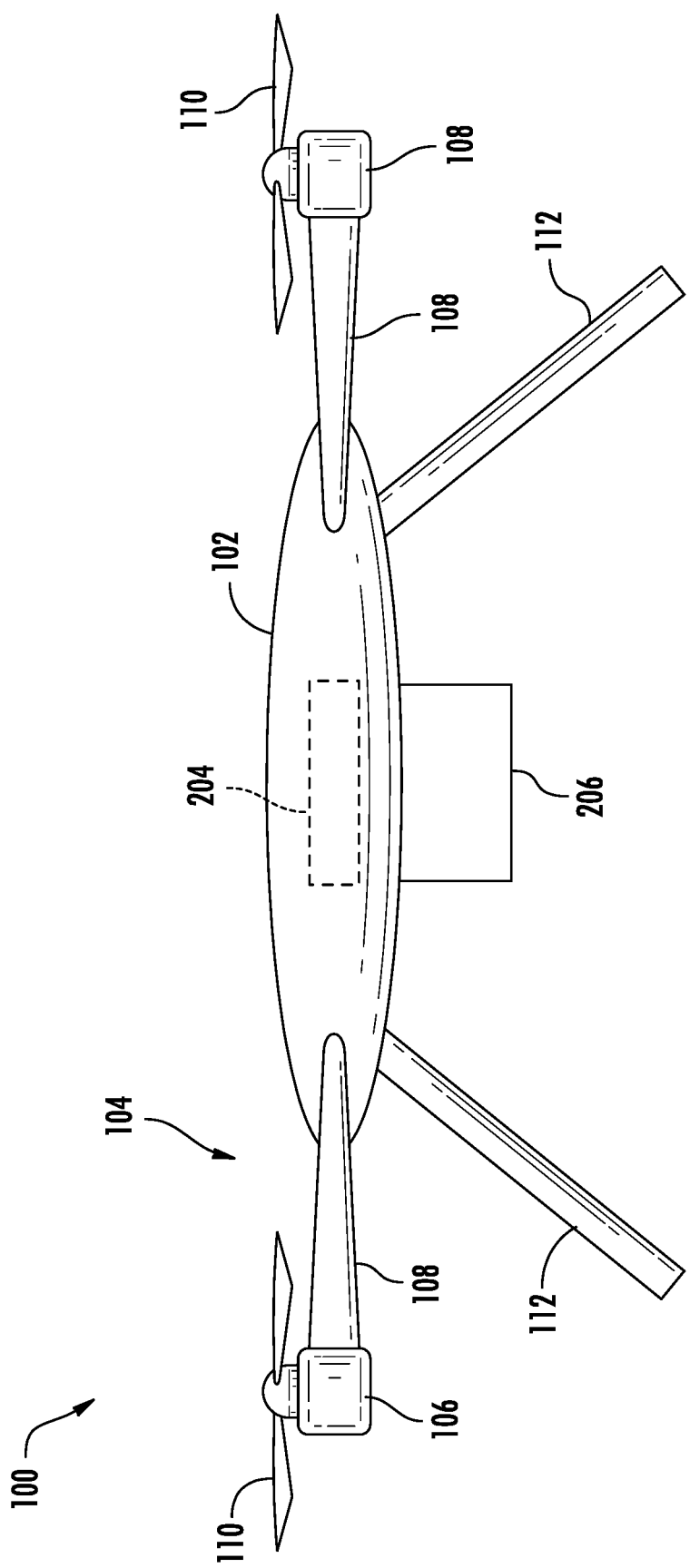
FIG. 2 illustrates a front view of one embodiment of an unmanned aerial vehicle (UAV) in accordance with aspects of the present subject matter.

Referring now to FIG. 2, a front view of one embodiment of an unmanned aerial vehicle (UAV) 100 is illustrated in accordance with aspects of the present subject matter. As will be described below, the UAV 100 is configured to take off (e.g., from the landing pad) from its current or home position and fly a work vehicle (e.g., the work vehicle 10), such as at a construction site. Once within a predetermined distance of the work vehicle (e.g., such that the UAV 100 is locked onto to the vehicle), the UAV 100 flies along a flight inspection path (e.g., the flight inspection path 34 shown in FIG. 1) to allow images of the inspection points of the vehicle to be captured. After images of all of the inspections points on the vehicle are captured, the UAV 100 may fly to another vehicle and fly along an inspection path to allow images of the inspection points of that vehicle to be captured and so on. Thereafter, the UAV 100 may return to its home position. As such, the UAV 100 may generally correspond to any suitable aerial vehicle capable of unmanned flight, such as any UAV capable of controlled vertical, or nearly vertical, takeoffs and landings. For example, in the illustrated embodiment, the UAV 100 is configured as a quadcopter. However, in alternative embodiments, the UAV 100 may be configured as any other multi-rotor aerial vehicle, such as a tricopter, hexacopter, or octocopter. In further embodiments, the UAV 100 may be configured as a single-rotor helicopter or a fixed wing, hybrid vertical takeoff and landing aircraft.

As shown in FIG. 2, the UAV 100 may include various components that permit the UAV 100 to take off and fly relative to one or more work vehicles before returning home. Specifically, in several embodiments, the UAV 100 may include a body or frame 102 that supports a propulsion system 104. For example, in one embodiment, the propulsion system 104 may include four motors 106 (two are shown in FIG. 2), with each motor 106 coupled to the body 102 via a support arm 108. Each motor 106 may, in turn, be configured to rotationally drive an associated propeller 110. Additionally, the UAV 100 may include a plurality of legs 112 configured to support the body 102 relative to a surface, such as when the UAV 100 is at landed position. However, in alternative embodiments, the propulsion system 104 may have any other suitable configuration. For example, the propulsion system 104 may include fewer or more than four motors 106 and associated propellers 110.

Moreover, in several embodiments, the UAV 100 may include a location sensor 204 positioned therein. In general, the location sensor 204 may be configured to determine the current location of the UAV 100 using a satellite navigation positioning system (e.g., a GPS system, a Galileo positioning system, the Global Navigation satellite system (GLONASS), the BeiDou Satellite Navigation and Positioning system, and/or the like). In such an embodiment, the location determined by the location sensor 204 may be transmitted to a computing system (e.g., in the form coordinates) and stored within the computing system's memory for subsequent processing and/or analysis. For instance, the determined location of the UAV 100 may be used to guide the UAV to the work vehicle(s) from its home or current position and then relative to the vehicle(s) as the UAV 100 flies along the inspection flight plan(s).

Furthermore, the system 200 may include one or more imaging devices 206 mounted on otherwise supported on the UAV 100. In general, the imaging devices(s) 206 may be configured to capture images depicting inspection points on a work vehicle (e.g., the vehicle 10) as the UAV 100 flies relative to the vehicle along an inspection flight path (e.g., the inspection flight path 34). As will be described below, a computing system may be configured to compare each captured image to a stored image depicting the corresponding inspection point in its operational state. Based on this comparison, the operational state of each inspection point can be determined.

In general, the imaging device(s) 206 may correspond to any suitable device(s) configured to capture images or other image data depicting the inspection point(s) of the vehicle(s). For example, in one embodiment, the imaging device(s) 206 may correspond to a stereographic camera(s) configured to capture three-dimensional images of the inspection point(s). In other embodiments, the imaging device(s) 206 may correspond to a monocular camera(s) configured to capture two-dimensional images of the inspection point(s). However, in alternative embodiments, the imaging device(s) 206 may correspond to any other suitable sensing device(s) configured to capture images or image-like data, such as a LIDAR sensor(s) or a RADAR sensor(s).

The imaging device(s) 206 may be installed at any suitable location(s) that allow the imaging device(s) 206 to capture images depicting the plants present within the field. For example, in some embodiments, the imaging device(s) 206 may be mounted on the underside of the body 102 of the UAV 100. However, in alternative embodiments, the imaging device(s) 206 may be installed at any other suitable location(s) on the UAV 100. Additionally, any suitable number of imaging device(s) 206 may be installed on the UAV 100.

It should be further appreciated that the configuration of the UAV 100 described above and shown in FIG. 2 is provided only to place the present subject matter in an exemplary field of use. Thus, it should be appreciated that the present subject matter may be readily adaptable to any manner of UAV configuration.

Figure 3:
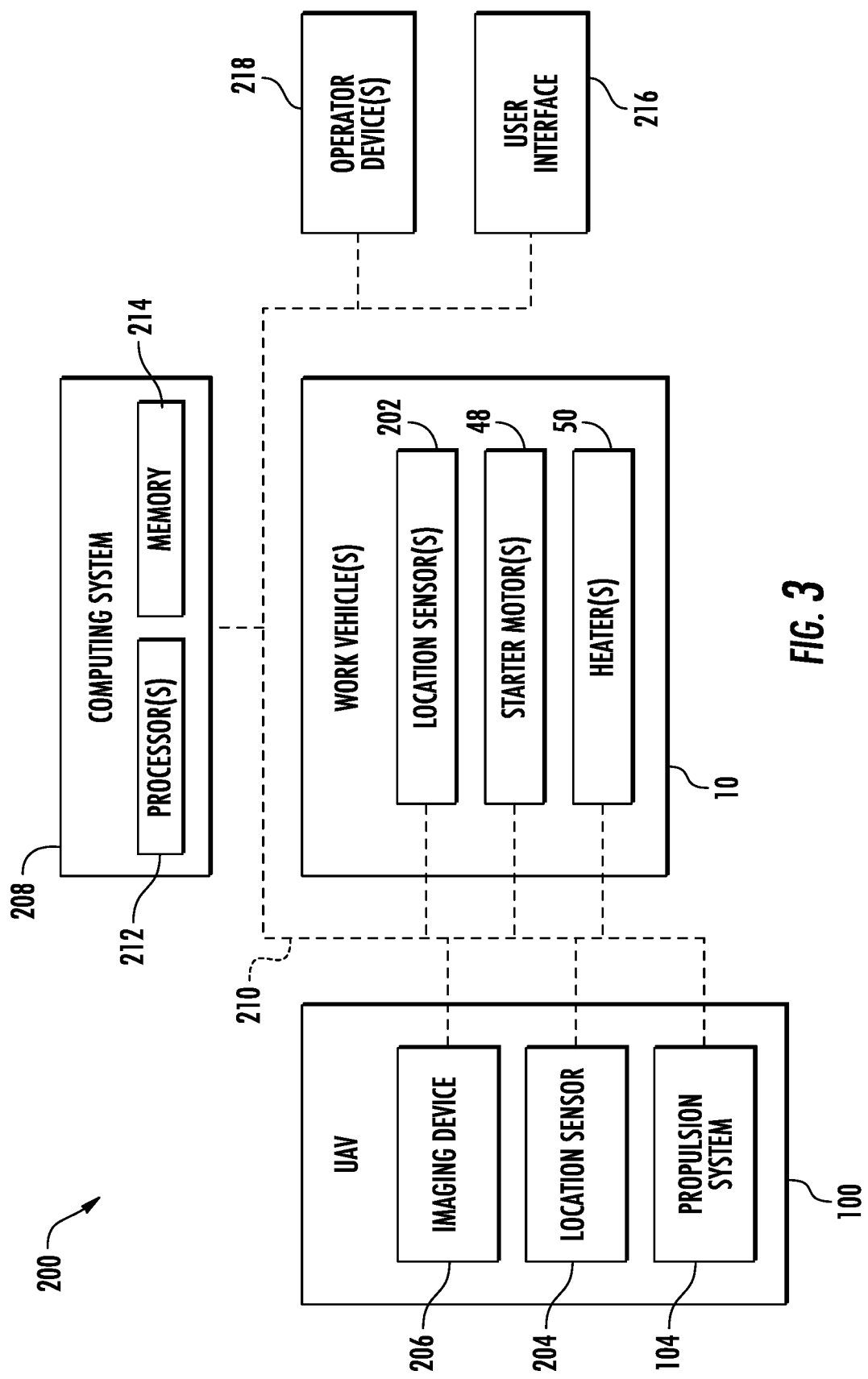
FIG. 3 illustrates a schematic view of one embodiment of a system for determining work vehicle operational state in accordance with aspects of the present subject matter.

Referring now to FIG. 3, a schematic view of one embodiment of a system 200 for determining work vehicle operational state is illustrated in accordance with aspects of the present subject matter. In general, the system 200 will be described herein with reference to the work vehicle 10 and the UAV 100 described above with reference to FIGS. 1 and 2. However, it should be appreciated by those of ordinary skill in the art that the disclosed system 200 may generally be utilized with work vehicles having any other suitable vehicle configuration and UAVs having any other suitable UAV configuration.

As shown in FIG. 3, the system 200 includes one or more components of the UAV 100, such as the propulsion system 104, the location sensor 204, and/or the imaging device 206. Furthermore, the system 200 may include one or more components of each work vehicle 10 that will be inspected using the UAV 100. For example, in the illustrated embodiment, the system 200 includes the location sensor 202, a starter motor 48, and a heater 50 each work vehicle 10 that will be inspected using the UAV 100. In general, the starter motor 48 corresponds to any device (e.g., an electric motor) configured to crank or otherwise start an engine (not shown) of the work vehicle 10. Moreover, the heater 50 may correspond to any device (e.g., a grid heater) configured to provide heat to the cab 18 of the work vehicle 10. However, in alternative embodiments, the system 200 may include any other suitable components of the work vehicle(s) being inspected and/or the UAVs 100 in addition to or lieu of the aforementioned components.

Additionally, the system 200 includes a computing system 208 communicatively coupled to one or more components of the work vehicle(s) 10 and/or the UAV 100 to allow the operation of such components to be electronically or automatically controlled by the computing system 208. For example, the computing system 208 may be communicatively coupled to the imaging device 206 of the UAV 100 via a communicative link 210. As such, the computing system 208 may be configured to receive images or other image data from the imaging device 206 depicting the inspection points on the work vehicle(s) 10. Moreover, the computing system 208 may be communicatively coupled to the location sensor(s) 202 of the work vehicle(s) 10 and/or the location sensor 204 of the UAV 100 via the communicative link 210. Thus, the computing system 208 may be configured to location data from the location sensors 202, 204 that is indicative of the locations of the work vehicle(s) 10 and/or the UAV 100. Furthermore, the computing system 208 may be communicatively coupled to the starter motor(s) 48 and/or the heater(s) 50 of the work vehicle(s) 10 and/or the propulsion system 104 of the UAV 100 via the communicative link 210. In this respect, the computing system 208 may be configured to control the operation of these components 48, 50, 104. In addition, the computing system 208 may be communicatively coupled to any other suitable components of the work vehicle(s) 10 and/or the UAV 100.

In general, the computing system 208 may comprise one or more processor-based devices, such as a given controller or computing device or any suitable combination of controllers or computing devices. Thus, in several embodiments, the computing system 208 may include one or more processor(s) 212 and associated memory device(s) 214 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 214 of the computing system 208 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 214 may generally be configured to store suitable computer-readable instructions that, when implemented by the processor(s) 212, configure the computing system 208 to perform various computer-implemented functions, such as one or more aspects of the methods and algorithms that will be described herein. In addition, the computing system 208 may also include various other suitable components, such as a communications circuit or module, one or more input/output channels, a data/control bus and/or the like.

The various functions of the computing system 208 may be performed by a single processor-based device or may be distributed across any number of processor-based devices, in which instance such devices may be considered to form part of the computing system 208. For instance, the functions of the computing system 208 may be distributed across multiple application-specific controllers or computing devices, such as a UAV-based controller, a work vehicle-based controller(s) (e.g., an engine controller), a construction site-based computing device(s) (e.g., a server in a construction site management office, a remote or offsite computing device(s) (e.g., a computing device(s) in a server farm), and/or the like.

In some embodiments, the system 200 may also include a user interface 216. More specifically, the user interface 216 may be configured to provide feedback from the computing system 208 (e.g., notifications associated with the operational status of one or more work vehicles 10). As such, the user interface 216 may include one or more feedback devices (not shown), such as display screens, speakers, warning lights, and/or the like, that are configured to provide feedback from the computing system 208. In this respect, the user interface 216 may be communicatively coupled to the computing system 208 via the communicative link 210 to permit the received feedback to be transmitted from the computing system 208 to the user interface 216. In one embodiment, the user interface 216 may be positioned within a construction site management office. However, in alternative embodiments, the user interface 216 may mounted at any other suitable location.

Additionally, in some embodiments, the system 200 may include one or more operator devices 218. In general, each operator device 218 corresponds to a device present on the person of an operator of the one of the work vehicles 10 being inspected using the UAV 100 that provides the location of the operator to the computing system 208. As such, the operator device(s) 218 may be communicatively coupled to the computing system 208 via a communicative link 220 (e.g., 4G, LTE, etc.) to permit data indicative of the location of the operator(s) to be transmitted from the operator device(s) 218 to the computing system 208. For example, the operator device(s) 218 may correspond to a Smartphone, a Smartwatch, a tablet, and/or the like. As will be described below, the computing system 208 may use the location data received from the operator device(s) 218 to determine the proximity of the operator(s) to the corresponding work vehicle 10.

Figure 4:
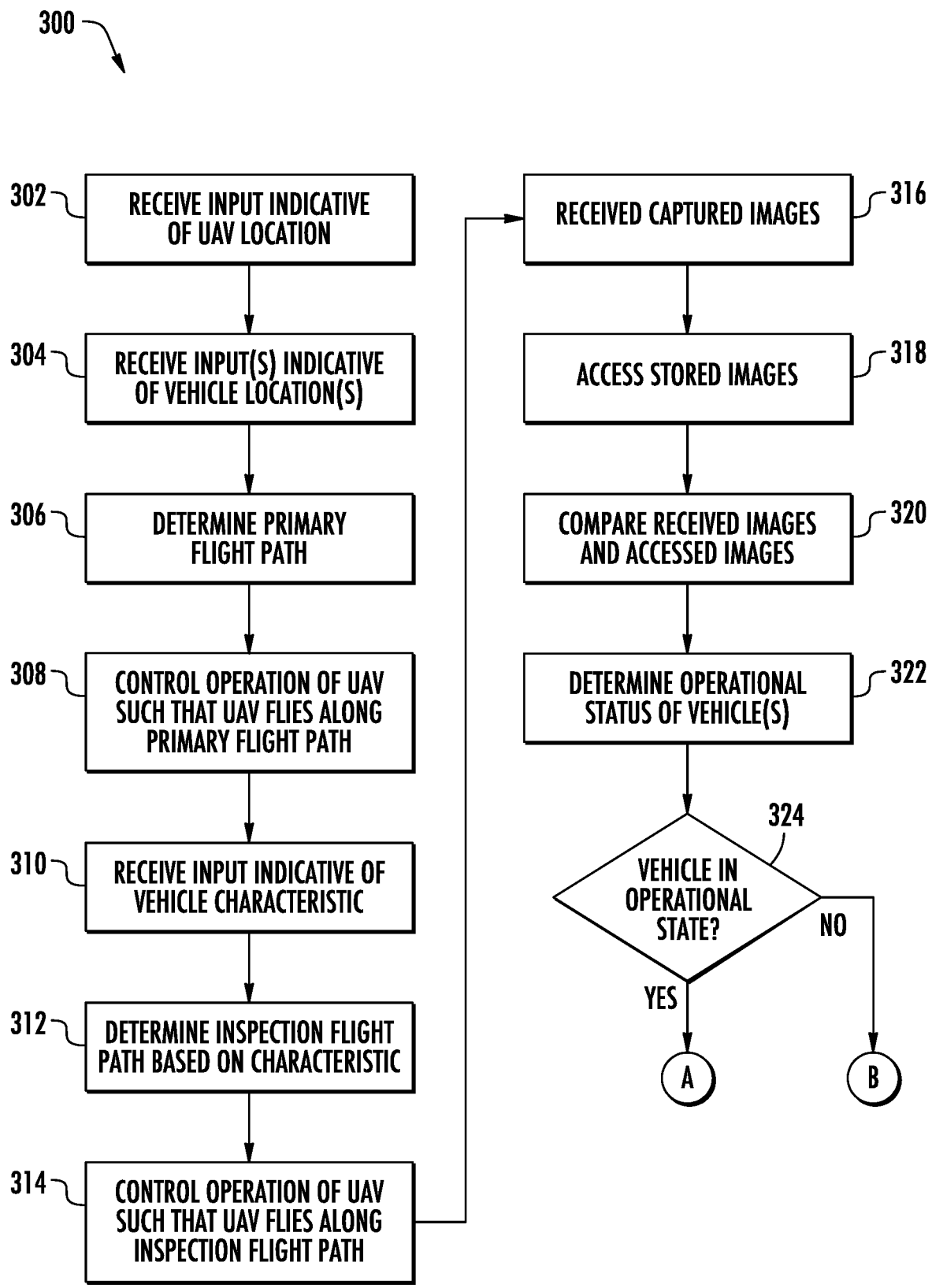
FIG. 4 illustrates a flow diagram providing a first portion of one embodiment of example control logic for determining work vehicle operational state in accordance with aspects of the present subject matter.
Figure 5:
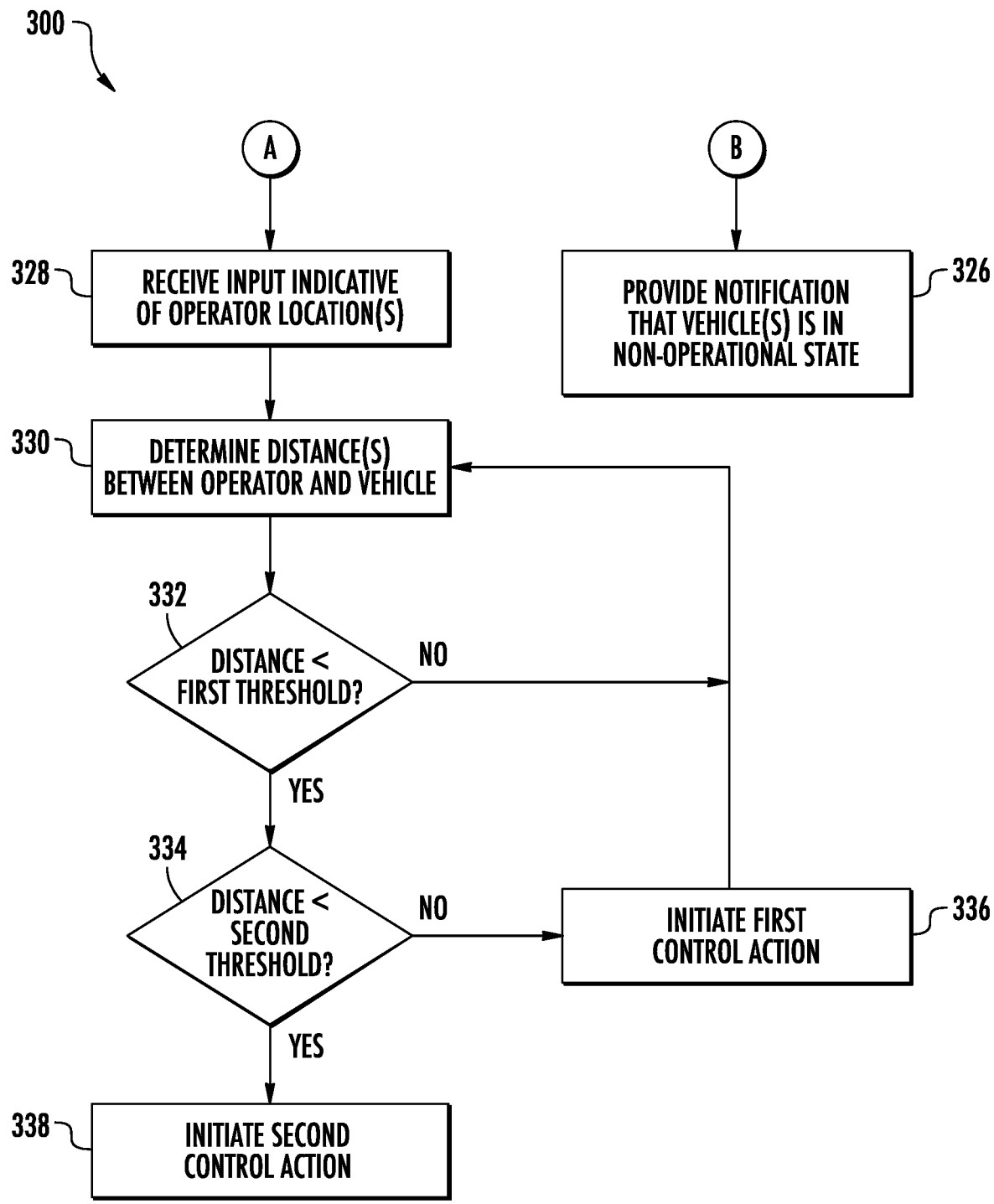
FIG. 5 illustrates a flow diagram providing a second portion of the embodiment of the example control logic for determining work vehicle operational state shown in FIG. 4.

Referring now to FIGS. 4 and 5, a flow diagram of one embodiment of example control logic 300 that may be executed by the computing system 208 (or any other suitable computing system) for determining work vehicle operational state is illustrated in accordance with aspects of the present subject matter. Specifically, the control logic 300 shown in FIGS. 4 and 5 is representative of steps of one embodiment of an algorithm that can be executed to determine the operational state of one or more work vehicles (e.g., a construction vehicle(s)) without the need for the operator(s) to perform visual inspection of the vehicle(s) before operation. Moreover, when it is determined that a work vehicle(s) is in an operational state, the control logic 300 can be executed to initiate one or more control actions that reduce the amount of time the operator is present within the vehicle and not performing a work operation (e.g., a construction operation). Thus, in several embodiments, the control logic 300 may be advantageously utilized in association with a system installed on or forming part of a work vehicle(s) or a UAV to allow for real-time determination of work vehicle operational state without requiring substantial computing resources and/or processing time. However, in other embodiments, the control logic 300 may be used in association with any other suitable system, application, and/or the like for determining work vehicle operational state.

Referring specifically to FIG. 4, at (302), the control logic 300 includes receiving an input indicative of the location of a UAV. Specifically, as mentioned above, in several embodiments, the UAV 100 includes a location sensor 204 configured to capture data indicative of the location of the UAV 100. In this respect, the computing system 208 may be communicatively coupled to the location sensor 204 via the communicative link 210. As such, the computing system 208 may receive data (e.g., coordinates) indicative of the location of the UAV 100 from the location sensor 204. Alternatively, the computing system 208 may receive any other suitable input indicative of the location of the UAV 100. For example, in one embodiment, the location of the UAV 100 may be provided via the user interface 216. As will be described below, the location of the UAV 100 may be used when determining a primary flight path for the UAV 100 for use in inspecting one or more work vehicles 10.

At (304), the control logic 300 includes receiving one or more inputs indicative of the location(s) of one or more work vehicles to be inspected. Specifically, as mentioned above, in several embodiments, each work vehicle 10 includes a location sensor 202 configured to capture data indicative of the location of the corresponding work vehicle 10. In this respect, the computing system 208 may be communicatively coupled to the location sensor(s) 202 via the communicative link 210. As such, the computing system 208 may receive data (e.g., coordinates) indicative of the location(s) of the work vehicle(s) 10 from the location sensor(s) 202. Alternatively, the computing system 208 may receive any other suitable input(s) indicative of the location(s) of the work vehicle(s) 10. For example, in one embodiment, the location(s) of the work vehicle(s) 10 may be provided via the user interface 216. As will be described below, the location(s) of the work vehicle(s) 10 may be used when determining a primary flight path for the UAV 100 for use in inspecting one or more work vehicles 10.

Furthermore, at (306), the control logic 300 includes determining a primary flight path for the UAV. In general, the primary flight path is the flight path along which the UAV 100 flies from its current or home position to each of the work vehicles 10 being inspected before returning home. As will be described below, once the UAV 100 is locked onto a work vehicle 10 (e.g., within a predetermined distance of the vehicle 10), the UAV 100 will fly along an inspection flight path to allow the imaging device 206 to capture images of each inspection point of the vehicle 10. At the end of the inspection flight path, the UAV 100 will return to and fly along the primary flight path to additional work vehicles 10 or back home. That is, the primary flight path is the flight path between the current or home position of the UAV 100 and each of the work vehicles 10 being inspected, while inspection flight path is the flight path around the vehicle 10 to allow the capture of images of the inspection points. As such, in several embodiments, the computing system 208 may determine the current or home location of the UAV 100 based on the input received at (302) and the location(s) of the work vehicle(s) 10 being inspected based on the input(s) received at (304). Thereafter, the computing system 208 may determine the primary flight path based on the locations of the UAV 100 and the work vehicle(s) 10.

Figure 6:
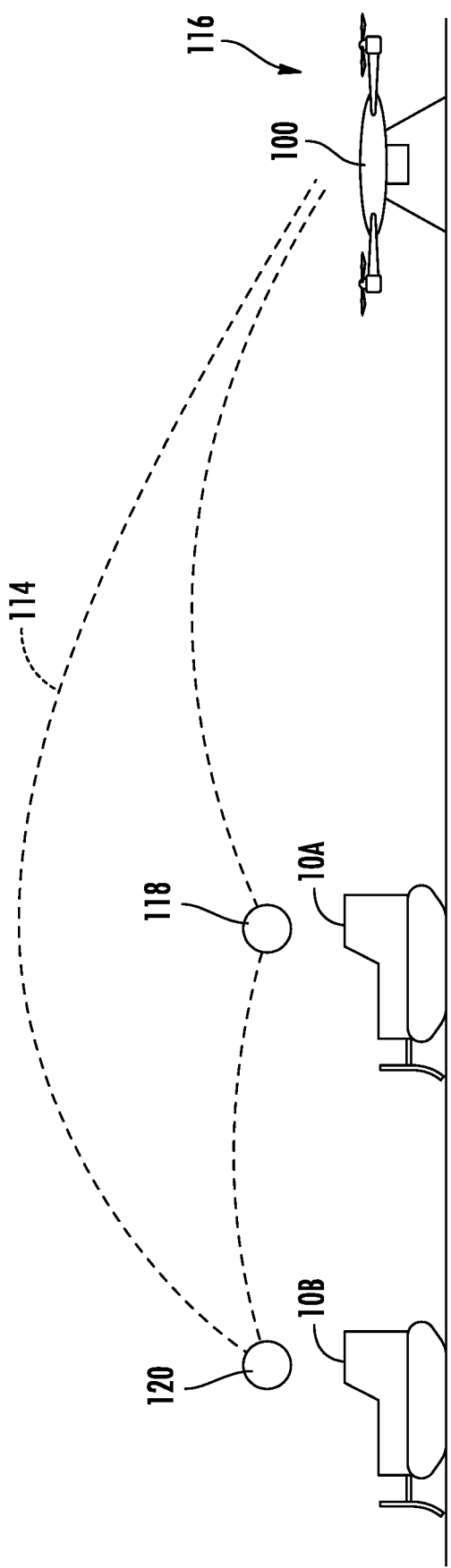
FIG. 6 illustrates a diagrammatic view of an example primary flight path defined between a pair of work vehicles and the current or home location of the UAV in accordance with aspects of the present subject matter.

For example, FIG. 6 illustrates an example view of a primary flight (e.g., as indicated by dashed line 114) determined at (306). Specifically, as shown, the UAV 100 is positioned at a current position 116. The current position 116 may, in turn, correspond to a home base, such as a landing pad. In the illustrated example, the operational status of a first work vehicle 10A and a second work vehicle 10B will be determined. As such, the primary flight path 114 extends from the current position 116 to a first position 118 at which the UAV 100 can lock onto the first work vehicle 10A. Once locked onto the first work vehicle 10A at the first position 118, the UAV 100 may fly along an inspection flight path associated with the first work vehicle 10A, thereby allowing images of its inspection points to be captured. In general, the UAV 100 is locked onto a work vehicle when the UAV 100 is close enough to the vehicle to allow the vehicle's location and/or orientation to be identified such that the inspection flight path can begin (e.g., the UAV 100 is within a predetermined distance of the vehicle). After completing the inspection flight path around the first work vehicle 10A, the UAV 100 returns to the primary flight path 114 and flies to a second position 120 at which the UAV 100 can lock onto the second work vehicle 10B. Once locked onto the second work vehicle 10B at the second position 120, the UAV 100 may fly along an inspection flight path associated with the second work vehicle 10B, thereby allowing images of its inspection points to be captured. Thereafter, the UAV 100 returns to the primary flight path 114 and flies back to the position 116.

Although the primary flight path 114 illustrated in FIG. 6 is configured for inspection of two work vehicles, the primary flight path may allow for inspection of any other suitable number of work vehicles, such as a single vehicle or three or more vehicles. Additionally, although the first and second work vehicles 10A, 10B are generally configured as crawler dozers, the work vehicles being inspected along the primary flight path may correspond to any suitable type or types of work vehicles, including different types of work vehicles.

Referring again to FIG. 4, at (308), the control logic 300 includes controlling the operation of the UAV such that the UAV flies along the primary flight path. Specifically, as mentioned above, in several embodiments, the computing system 208 may be communicatively coupled to the propulsion system 104 of the UAV 100 via the communicative link 210. In this respect, the computing system 208 may transmit control signals to the propulsion system 104 instructing the propulsion system 104 to propel the UAV 100 along the primary flight path (e.g., the primary flight path 114). Alternatively, the UAV 100 may be manually guided from its current or home position to each work vehicle 10 being inspected by a UAV operator.

At (310), the control logic 300 includes receiving an input indicative of a characteristic of a work vehicle being inspected. In several embodiments, after the UAV 100 flies along the primary flight path and locks onto one of the work vehicles 10, the computing system 208 may receive an input indicative of one or more characteristics of the vehicle 10. As will be described below, the characteristic(s) of the work vehicle 10 may be used to select or otherwise determine the inspection flight path for the vehicle 10. In this respect, the input received at (310) may be indicative of any suitable characteristic(s) of the vehicle 10 that allows an inspection flight plan to be selected or determined for the vehicle 10. For example, the input may be indicative of the type of the vehicle 10 (e.g., crawler dozer, tractor-loader-backhoe, etc.), the make or manufacturer of the vehicle 10, the model name/number of the vehicle 10, and/or the like.

In some embodiments, the input received at (310) may be a captured image of the work vehicle 10. Specifically, as described above, the UAV 100 includes the imaging device 206 supported thereon. As such, once the UAV 100 has locked onto the work vehicle 10, the imaging device 206 may capture one or more images of the vehicle 10. For example, in one embodiment, the images captured at (310) may depict the overall appearance the vehicle 10. In another embodiment, the captured images may depict a particular portion of the vehicle or indicia on the vehicle (e.g., manufacturer name, model name/number, etc.). The captured images may, in turn, be analyzed to determine the characteristic(s) of the work vehicle 10. Alternatively, the input received at (310) may be received from the location sensor 202 (e.g., the location data may include the characteristic(s), such as the make and model of the vehicle 10) or the user interface 216.

Moreover, at (312), the control logic 300 includes determining the inspection flight path for the work vehicle to which the UAV is locked on. In several embodiments, the computing system 208 may determine an inspection flight plan (e.g., the inspection flight plan 34 shown in FIG. 1) based on the input received at (310). Specifically, in some embodiments, a plurality of inspection flight plans may be stored within the memory device(s) 214 of the computing system 208. Each stored inspection flight plan may correspond to a work vehicle having specific characteristic(s). For example, in one embodiment, an inspection flight plan for each make and model of work vehicle within a fleet of vehicles being inspected may be stored within the memory device(s) 214. Thus, in such an embodiment, the computing system 208 may determine the make and model of the work vehicle 10 to which the UAV 100 is locked on. Thereafter, the computing system 208 make select or otherwise access the stored inspection flight plan corresponding to the determined make and model. However, in alternative embodiments, the inspection flight plan may be determined in any other suitable manner. For example, a UAV operator may provide the inspection flight path via the user interface 216 (e.g., by inputting specific positions or waypoint for the inspection flight path).

In addition, at (314), the control logic 300 includes controlling the operation of the UAV such that the UAV flies along the inspection flight path. Specifically, in several embodiments, the computing system 208 may transmit control signals to the propulsion system 104 instructing the propulsion system 104 to propel the UAV 100 along the inspection flight path (e.g., the inspection flight path 34 shown in FIG. 1). Alternatively, the UAV 100 may be manually guided along the inspection flight path by a UAV operator. As UAV 100 flies along the inspection flight path, the imaging device 206 captures one or more images of each inspection point on the work vehicle 10. In some embodiments, the captured images of the inspection points may be displayed on the user interface 216. After completing the inspection flight path a work vehicle 10 being inspected, the UAV 100 continues to fly along the primary inspection path to another work vehicle being inspected or back to its home position/base.

Furthermore, at (316), the control logic 300 includes receiving captured images depicting the inspection points of the work vehicle(s) being inspected. Specifically, in several embodiments, the computing system 208 may receive the images captured by the imaging device 206 during the inspection flight plan(s) via the communicative link 210. In some embodiments, the captured images may be transmitted to the computing system 208 during the inspection flight(s) (e.g., in real time). Alternatively, the captured images may be transmitted to the computing system 208 when the UAV 100 returns to its home position upon completion of the primary flight path.

Additionally, at (318), the control logic 300 includes accessing a plurality of stored images. Specifically, in several embodiments, the computing system 208 may access a plurality of images stored within its memory device(s) 214. Each stored image, in turn, depicts one of the inspection points in its operational state. For example, the stored images may depict the components of the work vehicle 10 associated with the inspection points (e.g., the blade 14; the track assemblies 22, 26; the hydraulic cylinders 30; the overall appearance; etc.) in an unworn and undamaged condition (e.g., as such components would have looked when the vehicle left the factory). Furthermore, the stored images may depict areas around the work vehicle 10 in an operational condition (e.g., the portion of the ground 32 underneath the vehicle 10 being free of leaked fluids).

Moreover, at (320), the control logic 300 includes comparing the captured images and the received images to determine whether each inspection point is in an operational state. Specifically, in several embodiments, the computing system 208 compares each captured image of an inspection point received at (316) to a corresponding stored image of that inspection point accessed at (318) to determine any differences therebetween. Based on this comparison, the computing system 208 determine whether each inspection point on each work vehicle 10 being inspected is in an operational state or a non-operational state. For example, the computing system 208 may use any suitable image processing techniques to compare the captured images and the stored images to determine any differences therebetween. When in an operational state, the inspected point has passed inspection and is in a condition suitable for the work vehicle 10 to be operated. Conversely, when in a nonoperational state, the inspected point has failed inspection and is not in a condition suitable for the work vehicle 10 to be operated. Thus, repair and/or replacement of a component(s) associated with an inspection point in the non-operational state may be required.

In addition, at (322), the control logic 300 includes determining the operational status of each work vehicle being inspected. Specifically, in several embodiments, the computing system 208 may determine whether each work vehicle 10 being inspected as part of the primary flight path is in an operational state or a non-operational state. When in the operational state, the work vehicle 10 is suitable for operation. Conversely, when in a nonoperational state, the work vehicle 10 is not suitable for operation. In some embodiments, the computing system 208 may determine that the work vehicle 10 is in the operational state when all of its inspection points are in the operational state. In other embodiments, the computing system 208 may determine that the work vehicle 10 is in the operational state when a certain percentage of its inspection points are in the operational state. Moreover, in further embodiments, the computing system 208 may determine that the work vehicle 10 is in the operational state when at least certain inspection points are in the operational state. However, in alternative embodiments, the computing system 208 may determine the operational state of each work vehicle 10 based on the operational statuses of its inspection points in any other suitable manner.

As shown in FIGS. 4 and 5, at (324), the control logic 300 includes determining whether each work vehicle being inspected is in the operational state. When a work vehicle(s) 10 being inspected is not in the operational state, the control logic 300 proceeds to (326) with respect to that vehicle(s) 10. In this respect, at (326), the control logic 300 includes providing a notification that a work vehicle(s) is in a non-operational state. For example, the computing system 208 transmit control signals via the communicative link 210 instructing the user interface 216 to provide a visual and/or audible notification that the work vehicle(s) 10 determined at (324) as being nonoperational are not in the operational state. In some embodiments, after (324), the computing system 208 may generate a map illustrating the location(s) of each work vehicle 10 inspected along the primary flight path and their corresponding operational statuses (e.g., whether each vehicle 10 is in the operational state or a non-operational state).

Conversely, when a work vehicle(s) 10 being inspected is in the operational state, the control logic 300 proceeds to (328) with respect to that vehicle(s) 10. In this respect, at (328), the control logic 300 includes receiving an operator input(s) indicative of the location of the operator(s) of the work vehicle(s). Specifically, in several embodiments, the system 200 may include one or more operator devices 218 configured to capture data indicative of the location of the operator(s) of the work vehicle(s) 10. In this respect, the computing system 208 may be communicatively coupled to the operator device(s) 218 via the communicative link 220. As such, the computing system 208 may receive data (e.g., coordinates) indicative of the location(s) of the work vehicle operator(s) from the operator device(s) 218. As will be described below, the location(s) of the operator(s) of the work vehicle(s) 10 in the operational state may be used to initiate control action(s) associated with such operational vehicle(s) 10.

Referring particularly to FIG. 5, at (330), the control logic 300 includes determining the distance between an operational work vehicle and the corresponding operator. Specifically, in several embodiments, the computing system 308 may be configured to determine the distance between each work vehicle 10 determined as being in the operational state at (324) and the corresponding operator. Such determination is generally made based on the input(s) indicative of the location(s) of the work vehicle(s) 10 received at (304) and the input(s) indicative of the location(s) of the operator(s) received at (328). As will be described below, when an operator is within a predetermined distance of the corresponding work vehicle 10, the computing system 208 may be configured to initiate one or more control actions associated with the operation of the vehicle 10.

Furthermore, at (332), the control logic 300 includes comparing the determined distance to a first threshold or predetermined distance value. Specifically, in several embodiments, the computing system 208 may compare each distance determined at (330) to the first threshold or predetermined distance value. When a determined distance is greater than the first distance value, the operator of the corresponding work vehicle 10 is too far away for it to be desirable for any control actions associated with that vehicle 10 to be initiated. In such instances, the control logic 300 returns to (328) with respect to that work vehicle 10. Conversely, when a determined distance is less than the first distance value, the control logic 300 proceeds to (334).

At (334), the control logic 300 includes comparing the determined distance to a second threshold or predetermined distance value. Specifically, in several embodiments, the computing system 208 may compare each distance determined at (330) to a second threshold or predetermined distance value, with the second distance being less than the first distance. As will be described below, the first and second distances may be selected based on the associated control action(s).

When a determined distance is less than the first distance value and greater than the second distance value, at (336), the control logic 300 includes initiating a first control action. Specifically, when a distance determined at (330) is less than the first distance value at (332) and greater than the second distance value at (334), the computing system 208 initiates a first control action(s) associated with the corresponding work vehicle 10. For example, in some embodiments, the first control action may correspond to activating the heater 50 of the work vehicle 10. In such embodiments, the computing system 208 may transmit control signals to the heater 50 via the communicative link 210 instructing the heater 50 activate or otherwise begin heating the cab 18. Thus, the first distance may be selected to provide sufficient time for the heater 50 to heat the cab 18 of work vehicle 10, thereby allowing the operator to enter a warm cab and begin the construction operation without waiting. Thereafter, the control logic 300 returns to (328).

Conversely, when a determined distance is less than the first and second distance values, at (338), the control logic 300 includes initiating a second control action. Specifically, when a distance determined at (330) is less than the first distance value at (332) and less than the second distance value at (334), the computing system 208 initiates a second control action(s) associated with the corresponding work vehicle 10. For example, in some embodiments, the second control action may correspond to starting an engine (not shown) of the work vehicle 10. In such embodiments, the computing system 208 may transmit control signals to the starter motor 48 via the communicative link 210 instructing the starter motor 48 activate or otherwise crank the engine. Thus, the second distance may be selected to provide sufficient time for the engine of work vehicle 10 to warm up to a suitable operating temperature, thereby allowing the operator to begin the construction operation without waiting. Thus, the second control action(s) may be performed after the first control action(s).

In alternative embodiments, the computing system 208 may be configured to initiate any other suitable control action(s) based on the distance(s) between the operator(s) and the operational work vehicle(s) 10 in addition to or in lieu of activating the heater(s) 50 and starting the engine(s). Additionally, any suitable number of control actions may be initiated, including multiple control actions simultaneously or control action(s) based on additional distance value(s) (e.g., a third distance value).

Figure 7:
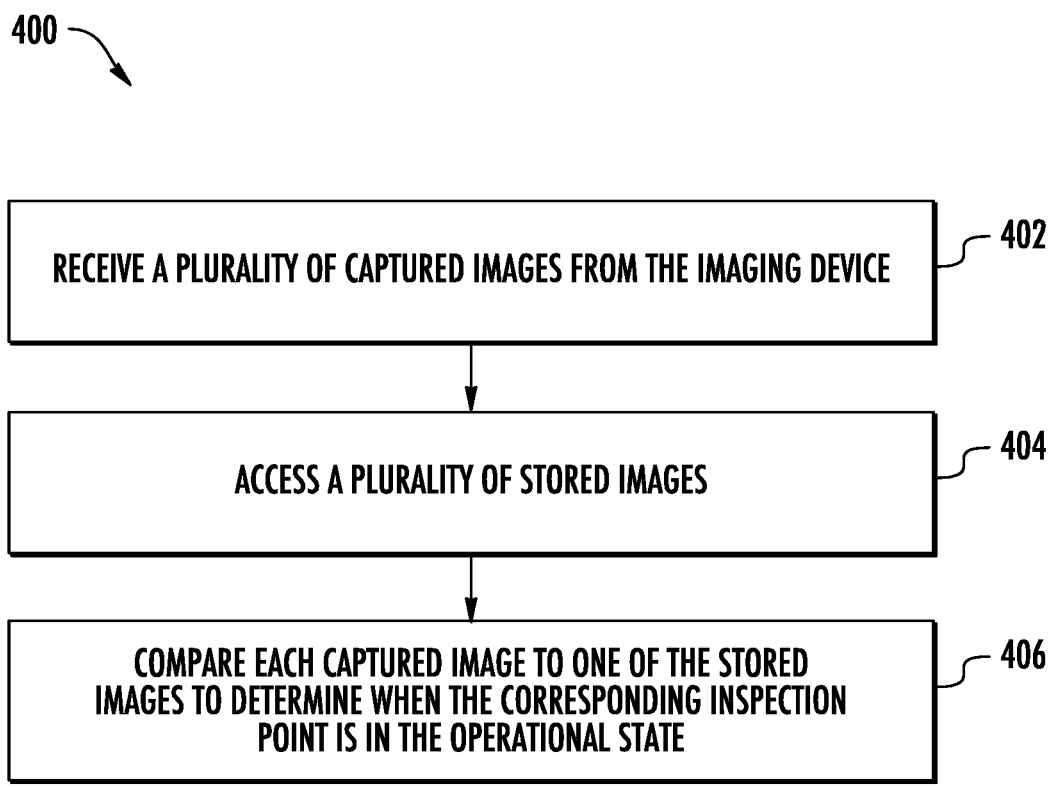
FIG. 7 illustrates a flow diagram of one embodiment of a method for determining work vehicle operational state in accordance with aspects of the present subject matter.

Referring now to FIG. 7, a flow diagram of one embodiment of a method 400 for determining work vehicle operational state is illustrated in accordance with aspects of the present subject matter. In general, the method 400 will be described herein with reference to the work vehicle 10, the UAV 100, and the system 200 described above with reference to FIGS. 1-6. However, it should be appreciated by those of ordinary skill in the art that the disclosed method 400 may generally be implemented with any work vehicle having any suitable vehicle configuration, with any UAV having any suitable UAV configuration, and/or within any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (402), the method 400 may include receiving, with a computing system, a plurality of captured images from an imaging device supported on a UAV. For example, as described above, the computing system 208 may be configured to receive a plurality of captured images depicting a plurality of inspection points on one or more work vehicles 10 from the imaging device 206 supported on the UAV 100 (e.g., via the communicative link 210).

Additionally, at (404), the method 400 may include accessing, with the computing system, a plurality of stored images. For example, as described above, the computing system 208 may be configured to access a plurality of stored images (e.g., from its memory device(s) 214). Each stored image, in turn, depicts one of the inspection points in an operational state.

Moreover, as shown in FIG. 7, at (406), the method 400 may include comparing, with the computing system, each captured image to one of the stored images to determine when the corresponding inspection point is in the operational state. For example, as described above, the computing system 208 may be configured to compare each captured image to one of the stored images to determine when the corresponding inspection point is in the operational state.

It is to be understood that the steps of the control logic 300 and the method 400 are performed by the computing system 208 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 208 described herein, such as the control logic 300 and the method 400, is implemented in software code or instructions which are tangibly stored on a tangible computer readable medium. The computing system 208 loads the software code or instructions via a direct interface with the computer readable medium or via a wired and/or wireless network. Upon loading and executing such software code or instructions by the computing system 208, the computing system 208 may perform any of the functionality of the computing system 208 described herein, including any steps of the control logic 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for determining work vehicle operational state, the system comprising:
   an unmanned aerial vehicle (UAV) configured to fly relative to a work vehicle;
   an imaging device supported on the UAV, the imaging device configured to capture a plurality of images of the work vehicle as the UAV flies relative to the work vehicle, each captured image depicting one of a plurality of inspection points on the work vehicle; and
   a computing system communicatively coupled to the imaging device, the computing system configured to:
      receive the plurality of captured images from the imaging device;
      access a plurality of stored images, each stored image depicting one of the plurality of inspection points in an operational state;
      compare each captured image to one of the stored images to determine when the corresponding inspection point is in the operational state; and
      receive an input indicative of a location of the work vehicle;
      receive an input indicative of a location of an operator of the work vehicle;
      determine a distance between the operator and the work vehicle when it is determined that all of the plurality of inspection points are in the operational state; and
      initiate a control action associated with an operation of the work vehicle when the operator is less than a predetermined distance from the work vehicle.

2. The system of claim 1, wherein the predetermined distance corresponds to a first predetermined distance and the control action corresponds to a first control action, the computing system further configured to initiate a second control action associated with the operation of the work vehicle when the operator is less than a second predetermined distance from the work vehicle, the second predetermined distance being less than the first predetermined distance.

3. The system of claim 1, wherein the control action comprises at least one of activating a heater of the work vehicle or starting an engine of the work vehicle.

4. The system of claim 1, the computing system is further configured to:
receive an input indicative of a characteristic of the work vehicle; and
determine an inspection flight path along which the UAV flies relative to the work vehicle such that the imaging device is positioned to capture the plurality of images based on the characteristic.

5. The system of claim 1, wherein the computing system is further configured to receive the input from the imaging device.

6. The system of claim 1, wherein the computing system is further configured to receive the input from the work vehicle.

7. The system of claim 1, wherein the plurality of inspection points comprises at least one of a blade of the work vehicle, a hydraulic component of the work vehicle, a surface underneath the work vehicle, or a track assembly of the work vehicle.

8. The system of claim 1, wherein the computing system is further configured to:
receive an input indicative of a location of the work vehicle; and
determine a primary flight path along which the UAV is to fly between a current location of the UAV and the location of the work vehicle.

9. The system of claim 1, wherein the work vehicle corresponds to a first work vehicle, the UAV further configured to fly relative to a second work vehicle such that the imaging device captures a plurality of images of the second work vehicle as the UAV flies relative to the second work vehicle, each captured image depicting one of a plurality of inspection points on the second work vehicle, the computing system further configured to:
receive an input indicative of a location of the second work vehicle; and
determine the primary flight path along which the UAV is to fly between the current location of the UAV, the location of the first work vehicle, and the location of the second work vehicle.

10. The system of claim 1, wherein the work vehicle is a construction vehicle.

11. A system for determining work vehicle operational state, the system comprising:
an unmanned aerial vehicle (UAV) configured to fly relative to a work vehicle;
an imaging device supported on the UAV, the imaging device configured to capture a plurality of images of the work vehicle as the UAV flies relative to the work vehicle, each captured image depicting one of a plurality of inspection points on the work vehicle; and
a computing system communicatively coupled to the imaging device, the computing system configured to:
receive the plurality of captured images from the imaging device;
access a plurality of stored images, each stored image depicting one of the plurality of inspection points in an operational state;
compare each captured image to one of the stored images to determine when the corresponding inspection point is in the operational state; and
generate a map identifying a location of the first work vehicle, an operational status of the first work vehicle, a location of the second work vehicle, and an operational status of the second work vehicle.

12. A method for determining an operational state of a work vehicle using an unmanned aerial vehicle (UAV) configured to fly relative to the work vehicle, the UAV including an imaging device supported thereon, the imaging device configured to capture a plurality of images of the work vehicle as the UAV flies relative to the work vehicle, each captured image depicting one of a plurality of inspection points on the work vehicle, the method comprising:
receiving, with a computing system, the plurality of captured images from the imaging device;
accessing, with the computing system, a plurality of stored images, each stored image depicting one of the plurality of inspection points in an operational state;
comparing, with the computing system, each captured image to one of the stored images to determine when the corresponding inspection point is in the operational state;
receiving, with the computing system, an input indicative of a location of the work vehicle;
receiving, with the computing system, an input indicative of a location of an operator of the work vehicle;
determining, with the computing system, a distance between the operator and the work vehicle when it is determined that all of the plurality of inspection points are in the operational state; and
initiating, with the computing system, a control action associated with an operation of the work vehicle when the operator is less than a predetermined distance from the work vehicle.

13. The method of claim 12, wherein the predetermined distance corresponds to a first predetermined distance and the control action corresponds to a first control action, the method further comprising:
initiating, with the computing system, a second control action associated with the operation of the work vehicle when the operator is less than a second predetermined distance from the work vehicle, the second predetermined distance being less than the first predetermined distance.

14. The method of claim 12, wherein the control action comprises at least one of activating a heater of the work vehicle or starting an engine of the work vehicle.

15. The method of claim 12, further comprising:
receiving, with the computing system, an input indicative of a characteristic of the work vehicle; and
determining, with the computing system, an inspection flight path along which the UAV flies relative to the work vehicle such that the imaging device is positioned to capture the plurality of images based on the characteristic.

16. The method of claim 12, wherein receiving the input comprises receiving, with the computing system, the input from the imaging device.

17. The method of claim 12, wherein receiving the input comprises receiving, with the computing system, the input from the work vehicle.

18. The method of claim 12, wherein the plurality of inspection points comprises at least one of a blade of the work vehicle, a hydraulic component of the work vehicle, a surface underneath the work vehicle, or a track assembly of the work vehicle.

* * * * *